United States Patent [19]

Lelandais

[11] Patent Number: 4,870,522
[45] Date of Patent: Sep. 26, 1989

[54] ROTARY ELECTRIC COUPLING DEVICE FOR A ROTATING HEAD RECORDER

[75] Inventor: Guy Lelandais, Gif-Sur-Yvette, France

[73] Assignee: Schlumberger Industries, Montrouge, France

[21] Appl. No.: 201,236

[22] Filed: Jun. 2, 1988

[30] Foreign Application Priority Data

Mar. 7, 1988 [FR] France ............................. 88 02861

[51] Int. Cl.⁴ .............................................. G11B 5/52
[52] U.S. Cl. .................................................. 360/108
[58] Field of Search .......................................... 360/108

[56] References Cited

U.S. PATENT DOCUMENTS 4,364,098 12/1982 Hirota et al. ......................... 360/108
4,497,004 1/1985 Shibata ................................. 360/108

Primary Examiner—Robert S. Tupper
Attorney, Agent, or Firm—Sanford J. Asman

[57] ABSTRACT

A device for providing rotary electric coupling for a recorder/reader of magnetic tape including at least one magnetic head (21, 22) which is rotated at the periphery of an equatorial slot in a cylindrical drum over which the helically wound tape is caused to run. Said device is intended to transmit electrical signals representative of information recorded on or read from said tape, between a rotor-forming rotating portion connected to the head and a stator-forming stationary portion connected to electronic means respectively for emitting and/or receiving said information. The device further includes a two-plate capacitor (29, 42) for each of its heads (21, 22), said capacitor plates being disposed facing each other in pairs and one plate in each pair being fixed to the rotor and the other to the stator.

18 Claims, 6 Drawing Sheets

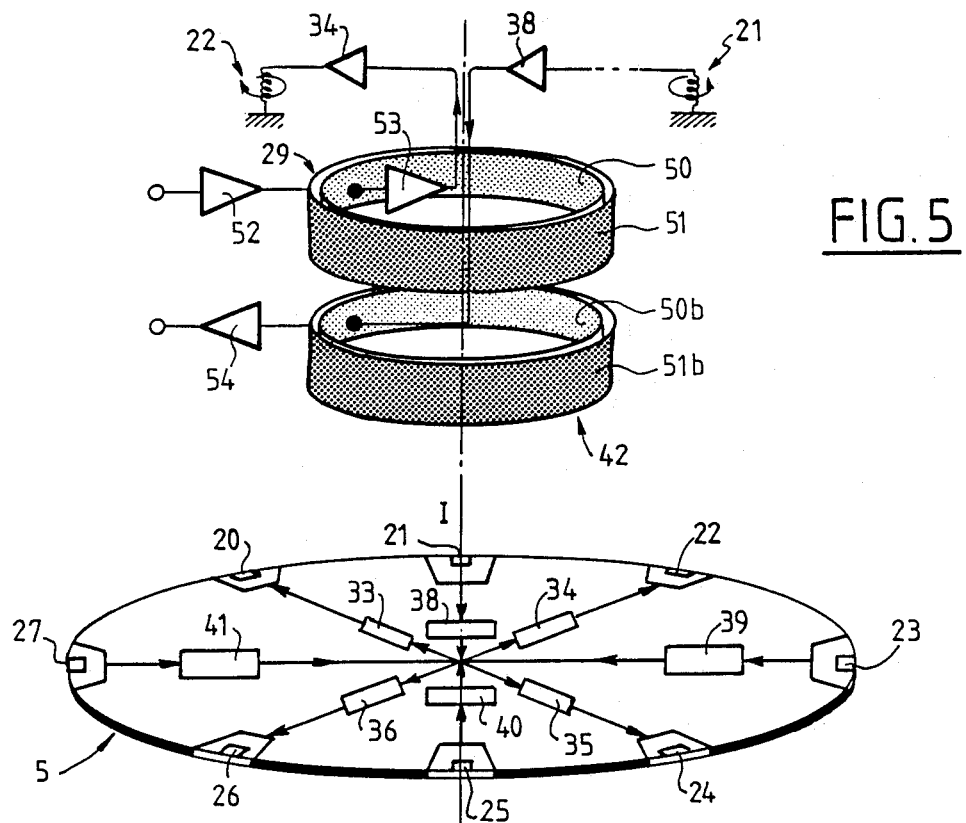
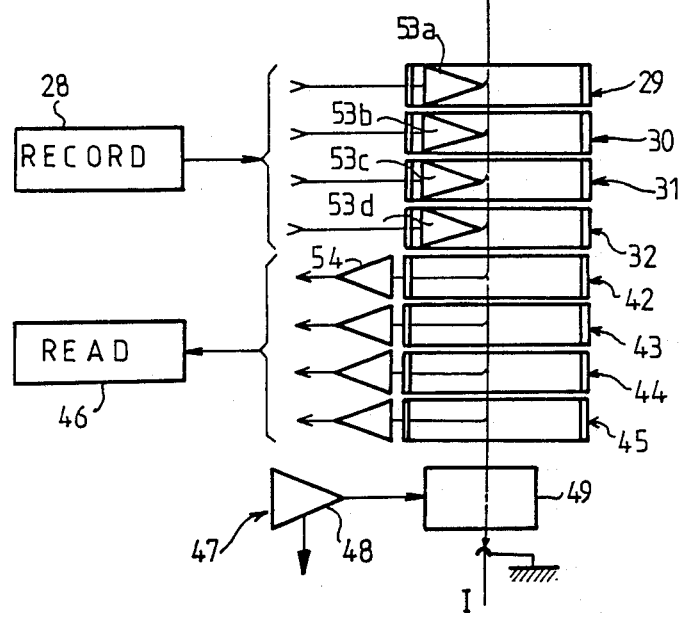
FIG. 5
FIG. 4

ROTARY ELECTRIC COUPLING DEVICE FOR A ROTATING HEAD RECORDER

The present invention relates to a rotary electric coupling device for a rotating head recorder, and to a recorder provided with such a device.

BACKGROUND OF THE INVENTION

Such recorders include one or more magnetic read/-write heads fixed to the periphery of a rotary component disposed to rotate about the axis of a cylindrical drum which has a magnetic tape wound helically around the surface thereof, with said tape running from a pay-out spool to a take-up spool. Information is recorded on the tape in sloping tracks with the angle of slope being a function of the ratio between the respective speeds of the tape and of the head. There are two families of recorders of this type. In the first family the heads are fixed to the periphery of a rotating platform which is coaxial with the drum and which is disposed in a slot provided in an equatorial plane of the drum, and said magnetic tape wound helically around the drum runs past said slot. In the other family, the drum comprises a stationary bottom portion and a rotating top portion with the heads fixed to the base thereof.

In order to convey information between the rotating heads and the associated (stationary) means of the recorder for processing or transmitting said information (for reading or recording purposes), each head is provided with a rotary electric coupling device between the stationary portion and the rotating portions (head-carrier platform) of the recorder.

Conventionally, the coupling device is constituted for each head by a rotating transformer comprising a rotor (associated with the head-carrier platform) and a (stationary) stator, both of which are cylindrical or annular in shape. The facing faces of the rotor and the stator are each provided with a groove containing a coil of conducting wire, thereby respectively constituting a (stator) primary winding and a (rotor) secondary winding.

Such prior devices suffer from drawbacks.

Because of the small sizes of the grooves in the stator and the rotor, and because of the small diameter of the electrically conducting wire used, putting the windings into place in the groove is complex and difficult. The resulting structure must have small mechanical clearances and any departure from the design dimensions has an effect on signal transmission.

Further, recorders of this type must be capable of reading and writing data at data throughput rates which can vary over a wide range (for example in a ratio of 1 to 25), whereas the format and the slope of the tracks on the tape is fixed (and set by standards, for example). Such different data rates imply that different head-to-tape relative speeds should be used, and as a result these speeds must also vary over a wide range.

This requires as a wide signal frequency band.

Unfortunately, prior rotating transformers put a limit on this frequency band.

Resonance phenomena in the equivalent circuit constituted by the head impedance and the leakage impedance in parallel on various stray capacitances have the effect of establishing an upper limit on the frequency band. Further, the circuit constituted by the output resistance of the amplifier connected to the transformer and the self-inductance of the transformer gives rise to a low cut-off frequency (depending on the value of said inductance) which applies a bottom limit to the frequency band.

The larger the ratio of the self-impedance over the leakage impedance (of the transformer), the wider the frequency passband.

For example, the frequency range obtained by prior transformers is at best about 100 kHz to 30 MHz (or 40 MHz). This range is not wide enough for satisfying all needs, given the available speed range, for which a frequency range of 3 kHz to 200 MHz (to −3 dB) would be necessary.

In addition, the mutual impedance of the transformer is difficult to control over the desired frequency range, in particular because it is difficult to control the characteristics of the ferrite used for making the transformer.

Finally, in order to verify write operations, a read operation accompanied by error correction is performed immediately after the write operation. Unfortunately the respective signal levels associated with these two operations are different: recording requires a high level signal whereas reading only gives rise to low level signals. Thus, the dynamic range over which such tranformers are capable of transmitting must be high, thereby increasing difficulties.

It is conventional practive to make use of auxiliary circuits to attempt to solve, or at least mitigate, these difficulties related to the use of rotating transformers.

In a first prior solution, the head-to-tape relative speed is fixed and the recorder includes a buffer memory containing an amount of data which varies as a function of time and which is related to variations in data throughput.

Although this technique makes it possible to reduce the frequency range to a range which is compatible with the frequency band limits applicable to prior rotating transformers (as indicated above), it does nothing to solve the difficulties related to the differences in level between recording and reading (also mentioned above). Further, this technique complicates the structure of the recorder by requiring the additional presence of the buffer memory whose capacity must be increased for increasing variations over time in data throughput.

A second solution consists in placing an electronic amplifier circuit on the head-carrier platform for each head. Each circuit is disposed between the head and the rotating transformer associated therewith. This provides read and write signals at compatible levels since the amplifiers can be used to reduce the level required for the recording signals and to increase the level of the read signals. Crosstalk is reduced by bringing these signal levels closer together. In addition, the passband is widened since the magnetic head is now isolated from the imperfect coupler constituted by the rotating transformer and it is therefore possible to give the self-inductance of the transformer a value such that the ratio of its self-impedance over the transformer leakage impedance is increased. In any event, because of the amplifier circuit on the platform, this ratio has less influence than in other prior solutions which do not include an amplifier circuit on the platform.

However, the opportunities for increasing this ratio are limited. This prior circuit thus gives rise to a frequency band which, although wider, nevertheless suffers from upper and lower limits which are too close together.

Thus, it will be understood that these two prior solutions solve the above-mentioned problems in part, only.

Further, neither of them escapes from the defect of the transformer being complex to make, since both of them require a transformer.

The present invention remedies these drawbacks and proposes a coupling device which is simple to make, which makes a wide frequency band possible, and which is unaffected by differences in signal level between recording and reading.

SUMMARY OF THE INVENTION

To this end, the present invention provides a rotary electric coupling device for a recorder/reader of magnetic tape including at least one magnetic head rotated at the periphery of an equatorial slot through a cylindrical drum over which a helically wound tape is caused to run, said device being intended to transmit electrical signals representative of information to be recorded on and/or information read from the tape between a rotor-forming rotating portion connected to the head and a stator-forming stationary portion connected to electronic means respectively for emitting and/or receiving said information, wherein the device comprises, for each head, a capacitor comprising two conducting plates disposed facing each other and fixed respectively to the rotor and to the stator.

A transmit plate and a receive plate for the signal to be transmitted are thus defined.

The plates are preferably concentric and cylindrical in shape.

In a preferred embodiment, each plate is fixed to a body of insulating material constituting a support which is generally annular in shape.

Advantageously, the plates are deposited on the support body by metallization.

Preferably, each body is generally U-shaped in section, with coplanar base webs extending transversely to the rotor, and with the conducting capacitor plates being applied to the respective outside faces of the facing flanges of said bodies.

Advantageously, the plates are smaller in height than each body, thereby leaving a free strip of body on either side of each plate and thus increasing the distance between each plate and the metal parts disposed in the vicinity thereof.

In order to reduce disturbing transmission because of stray capacitance between the plates and ground, and also between the plates of two axially-separated adjacent capacitors, two metal screening rings having a generally L-shaped section are provided for each coupling capacitor, with one branch of each L-shape being disposed transversely to the rotor and being fixed to the base web of the rotating portion or the stationary portion as the case may be of the capacitor.

Preferably, improved insulation is obtained by using screening rings each of which is provided with a lip pressed against the face of each body which carries the corresponding capacitor plate.

The receive plate of each capacitor is connected to a receive circuit including a high input impedance component such as a field effect transistor (FET).

In order to ensure that the low cut-off frequency of the high impedance circuit associated with the capacitor is as low as possible (in order to avoid affecting the bottom limit of the frequency range), the receiver circuit also has an impedance which is high in value when compared with the sum of the capacitance of the coupling capacitor and the input capacitance of the receive circuit.

In order to avoid the consequence of influence from the environment on this high impedance, it is constituted by a plurality of impedances disposed in a so-called "boot-strap" circuit.

Advantageously, the receive circuit is disposed in the vicinity of the receive plate.

The device in accordance with the invention is applicable to a recorder/reader comprising two series of magnetic heads, one for recording and the other for reading. In this case, the coupling capacitors are also split into two groups, one for recording and the other for reading. For a coupling capacitor used for recording, the emit plate is the fixed plate and the receive plate is the rotating plate. For a coupling capacitor used for reading, the corresponding relationship is the other way around.

More precisely, for a coupling capacitor connected to a record head (in which case the receive plate is the rotating plate), the receive circuit is disposed on the portion of the capacitor which is connected to the hub fixed to the rotorforming head-carrier platform, and it is preferably disposed on the top face of the annular body constituting the rotating portion of the capacitor.

Advantageously, the emit plate is connected to an emit circuit including a transistor having low output impedance.

Preferably, the device includes ground return means operating in differential mode and provided with additional rotary coupling means associated with means suitable for delivering a current to the terminals of said additional coupling means, which current is in the opposite direction to the current flowing through each of the coupling capacitors transmitting information signals.

More precisely, the ground return means comprise an additional capacitor having one plate connected to the output from a first amplifier whose input is connected to the output from a first summing and inverting circuit receiving the currents from each of the signals coming from the respective emit circuits of the recording capacitors; with the other plate of said additional capacitor being connected to the output of a second amplifier whose input is connected to the output from a second summing and inverting circuit receiving currents relating to each of the signals coming from respective receive circuits (belonging to the read capacitors).

The term "summing and inverting circuit" is used to designate a circuit delivering an output signal which corresponds to the sum of its input signals and which is opposite in sign.

The invention also relates to a recorder/reader having a rotating head provided with a coupling device of the type described in the present application.

BRIEF DESCRIPTION OF THE DRAWINGS

An embodiment of the invention is described by way of example with reference to the accompanying drawings, in which:

FIG. 4 is a diagram showing the rotor-stator connections in side view, together with a perspective view of the plate;

FIG. 5 is a diagrammatic perspective view of two coupling capacitors, one for recording and the other for reading;

MORE DETAILED DESCRIPTION

Figure 1:
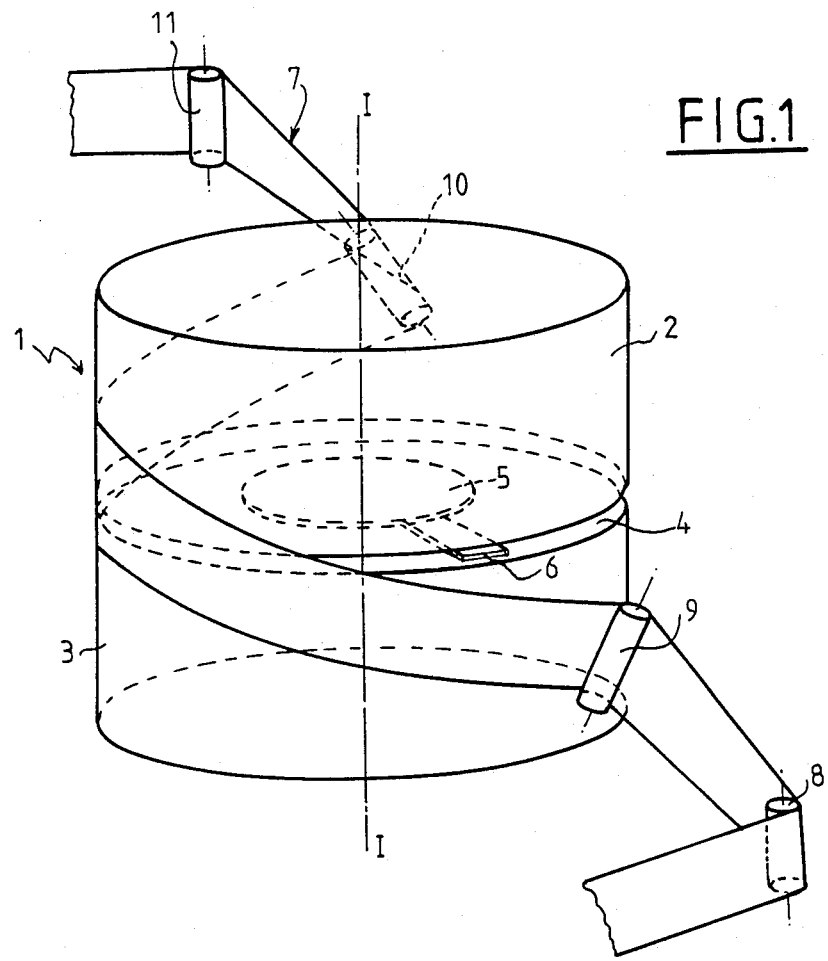
FIG. 1 is a perspective diagram of a recorder/reader of the type to which the invention is applicable.

The device of the present invention is described below with reference to a particular application relating to rotating magnetic head recording/reading apparatuses of a type which is known per se, and as shown diagrammatically in FIGS. 1 and 2.

The recorder/reader comprises a cylindrical drum 1 constituted by a top drum 2 and a bottom drum 3 which are separated by a slot 4 lying in an equatorial plane perpendicular to the axis I—I of the drum and located substantially half-way therealong.

A disk-shaped component 5 is provided in said slot and is suitable for being rotated about the axis I-I of the drum. The disk carries one, and generally several, magnetic heads 6 disposed regularly around its periphery and projecting very slightly from the surface which defines the wall of the drum.

Figure 2:
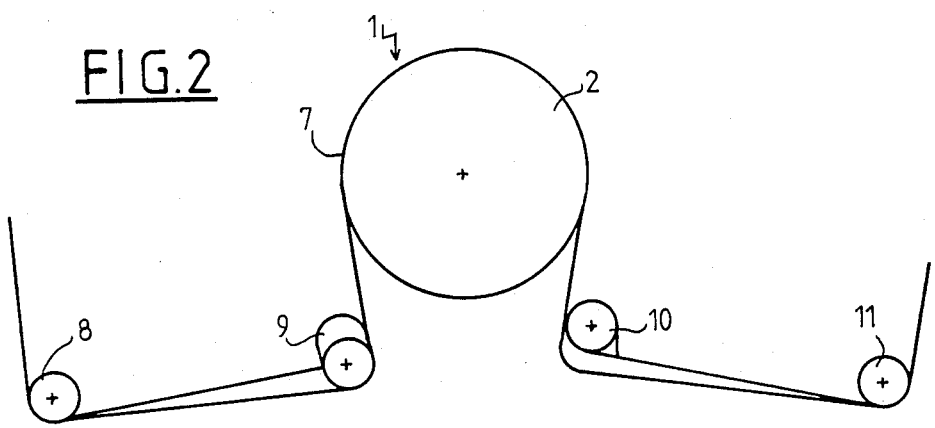
FIG. 2 is a plan view of the device shown in FIG. 1.

A magnetic tape 7 is suitable for being wound helically about the drum 1 in order to constitute, as seen from above in FIG. 2, an omega-shape. A set of guide pulleys 8 to 11 guide the tape 7 and hold it in this configuration as it runs from a pay-out spool towards a take-up spool (not shown, and known per se). Information is recorded or read on the tape in track segments which are mutually parallel and which slope relative to the axis of the tape.

It should be understood that the invention is also applicable to recorders/readers of the type in which the heads are fixed around the periphery of the base of a top rotating drum which is coaxial with a stationary bottom drum, and with the tape running over the slot defined between the two drums.

Figure 3:
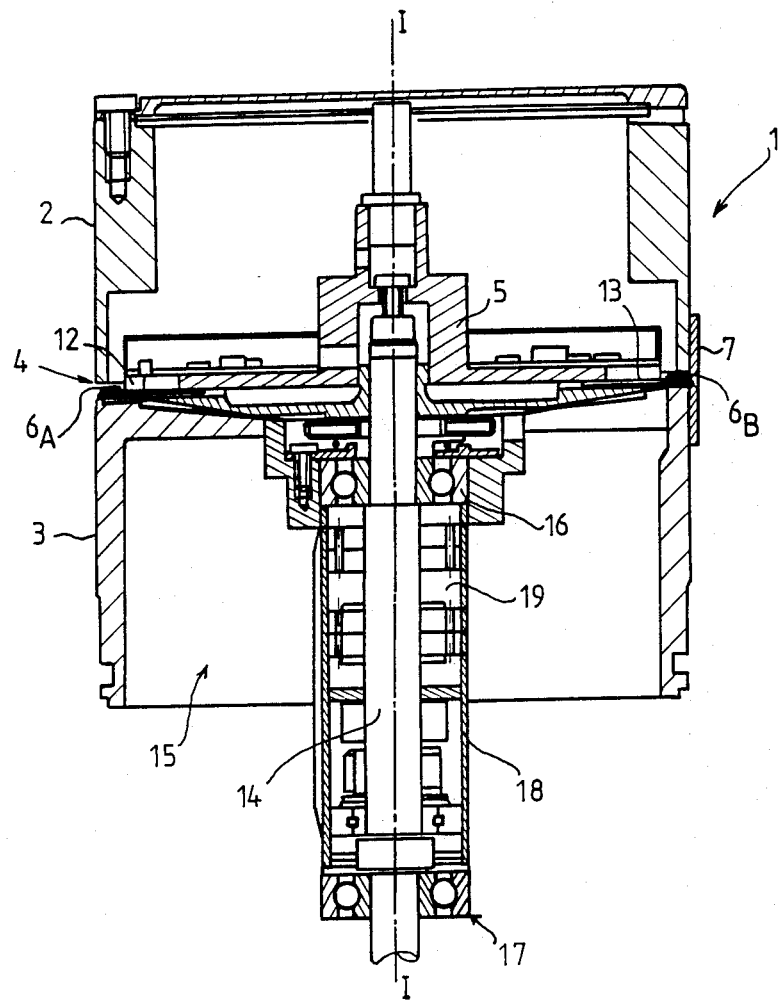
FIG. 3 is a fragmentary section through the drum and the electronic and mechanical components associated therewith.

FIG. 3 is a section showing the drum and the mechanical components associated therewith in a rotating head recorder, and in which items which are similar to those in FIGS. 1 and 2 have the same reference numerals.

The disk or platform 5 has radial tongues 12, 13 around its periphery with each of them carrying a magnetic head 6A, 6B at its end. The disk is fixed to a hub 14 which is coaxial about the axis I—I of the drum 1 and which is rotatably mounted relative to the stator 15. Said rotor-forming hub 14 is connected to the drum via ball bearings (known per se) and in particular via a top ball bearing 16 and a bottom ball bearing 17.

The inside of the bottom drum 3 contains a cylindrical sleeve 11 which is coaxial about the hub 14 and is disposed between the ball bearings 16 and 17. This sleeve is of larger diameter than the hub and defines a cylindrical chamber 19 housing rotating electrical coupling members (in accordance with the invention) for providing the connection between the magnetic heads connected to the rotor and electronic means (not shown in FIGS. 1 and 2) for the purpose of emitting and receiving information, which means are connected to the stator.

By way of example, the magnetic recorder/reader may be disposed on board an aircraft and may receive information coming from sensors and/or members for monitoring and/or controlling said aircraft. The information stored in this way on the magnetic tape is generally intended to be read and exploited at a later time.

In accordance with the invention, the rotating electrical coupling members are constituted by capacitive members, which are described below with reference to FIGS. 4 to 9.

FIG. 4 is a diagram showing the path along which information travels within a magnetic recorder/reader to which the invention is applied. Eight magnetic heads 20 to 27 are regularly distributed around the periphery of a rotating disk 5.

In the example described and shown, the recorder/reader has eight heads comprising four heads (20, 22, 24, and 26) for recording purposes and four other heads (21, 23, 25, and 27) for reading purposes.

An important criterion for such apparatus is reliability. It is therefore necessary to ensure that information is properly recorded so that it can be made use of subsequently. To this end, immediately after recording a track, the track which has just been recorded is read back. Thus, a record head is followed (in angular terms around the disk) by a read head.

Information-emitting means 28 (known per se) connected to sources of information to be recorded, have their outputs connected to rotating electrical coupling members (one per recording head) respectively referenced 29, 30, 31, and 32. These members provide electrical coupling between the fixed portions (stator) and the rotating portions (rotor). Only the axis of the rotor is shown in FIG. 4. The rotating portion 29, 30, 31, and 32 of each rotating electric coupling member is connected to the corresponding recording heads 20, 22, 24, and 26 via respective electronic amplifier circuits 33, 34, 35, and 36 disposed on the disk 5.

Similarly, each of the read heads 21, 23, 25, and 27 is connected via a respective amplifier circuit 38, 39, 40, and 41 disposed on the disk 5 to the rotating portion 42, 43, 44, and 45 of the corresponding electric coupling member. The fixed portons of these coupling members are connected to the inputs of means 46 for reading information, which information is then either stored or processed (in means not shown). Said means for receiving and storing information are known, per se.

Thus, each magnetic head corresponds to a capacitive coupling member.

Said coupling members are coaxial and are disposed close to one another along the axis of the rotor.

In the example described, eight coupling members are provided, i.e. four for recording purposes and four for reading purposes.

Electrical power supply means 47 (known per se) are also provided comprising a power source 48 and conventional rotating members 49 for transmitting power between the stator and the rotor.

The capacitive coupling members in accordance with the invention are described in greater detail below with reference to FIGS. 5 and 6.

FIG. 5 is a perspective view of a record coupling member 29 and a read coupling member 42. Each coupling member constitutes a rotating capacitor comprising two concentric cylindrical plates made of electrically conductive material and disposed at the same height along the rotor axis. A first plate 50 is connected to the rotor and is therefore rotating while a second plate 51 of slightly greater diameter is fixed to the stator, and is therefor stationary.

The radial gap between the outside wall of the rotating plate 50 and the inside wall of the stationary plate 51 is, for example, about 35 microns to 60 microns for a plate diameter of about 15 mm to 25 mm. The transfer capacitance is in the range of a few pF to several tens of pF, and is typically in the range 10 pF to 30 pF. The dielectric material between the two plates of any given capacitor is ambient air.

Each coupling capacitor comprises an emit plate and a receive plate. For a recording capacitor, the emit plate is the stationary plate and the receive plate is the rotating plate. The relationship is the other way around for a read capacitor.

An emit circuit 52 (constituting a portion of the information-emitting means 28) has its output connected to the stationary plate 51 of record coupling capacitor 29, while the rotating plate 50 thereof is connected to the input of a receive circuit 53 whose output is connected (on the rotor) to the magnetic head 22 via a corresponding amplifier circuit 34 (see FIG. 4). Thus, FIG. 4 shows four receive circuits 53a, 53b, 53c, and 53d, one for each of the record capacitors.

Conversely, the rotating plate 50b of the read coupling capacitor 42 is directly connected to the head 21 via the amplifier circuit 38, whereas the stationary plate 51b is connected to the input of a receive circuit 54 forming a portion of the receive means (see FIG. 4).

Figure 6A:
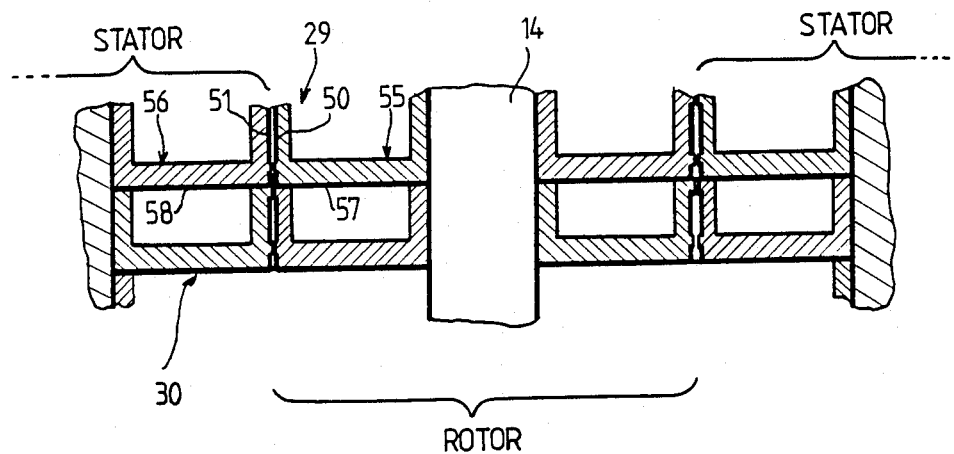
FIG. 6A is a diagrammatic section through two coupling capacitors in accordance with the invention.

Physically, the coupling capacitors are constituted in the manner described below with reference to FIG. 6A which shows an advantageous embodiment of two successive coupling capacitors 29 and 30. Naturally, in practice, eight similar capacitors are disposed in this manner along the rotor (in the FIG. 4 example.

Each metal plate 50 or 51 of a capacitor 29 is mounted on a respective body 55 or 56 of insulating material, which body is ring-shaped and has a U-shaped cross-section. The first body 55 has its smallest diameter portion fixed to the hub 14 of the rotor, while its largest diameter portion (constituting the other flange of the U-shaped as seen in section) carries the rotating plate 50 on its outside face. The second (stationary) body 56 is identical in shape to the first (rotating) body 55, but is of larger diameter. Its smallest diameter portion (constituting one of the flanges of the U-shape) carries the fixed plate 51 on its outside face (facing the rotating plate 50), while its larger diameter portion (the other flange of the U-shape) is fixed to the stator. The bodies 55 and 56 are fixed to the rotor and to the stator, respectively, by means of glue, for example. The height (axial extent) of the plates is less than the corresponding height of the bodies to which they are fixed.

Screening rings which are generally L-shaped are provided in order to constitute a screen between two adjacent capacitors. Thus, a first ring 57 is applied to the bottom face (base web of the U-shape) of the first body, and a second ring 58 is fixed to the base web of the second body 56.

Figure 6B:
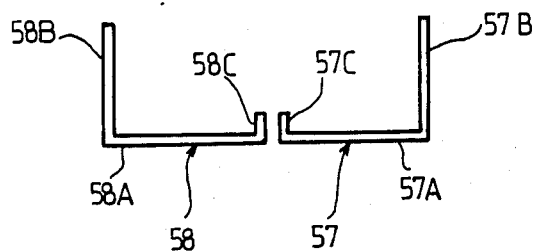
FIG. 6B is a section through two screening rings for a capacitor.

As shown in FIG. 6B, the screening rings 57 and 58 each include a branch 57A or 58A placed on the base web of the U-shape of each body 55 or 56, and a perpendicular branch 57B or 58B which is pressed against the outside face of the U-shape base web furthest from the face on which the corresponding capacitor plate (50, 51) is fixed. Each screening ring includes a lip extending at right angles from its end closest to the corresponding capacitor plate. The lips 57C and 58C are pressed against the bottom portions of the faces of the bodies on which the plates are mounted.

This way of making the capacitors is advantageous since it reduces stray capacitance. In the configuration shown, two corresponding plates (be they rotating or fixed) of two adjacent capacitors disposed side-by-side along the axis of the rotor have a very small facing surface area determined, substantially, by the thickness of the plates (i.e. a few microns).

Figure 7:
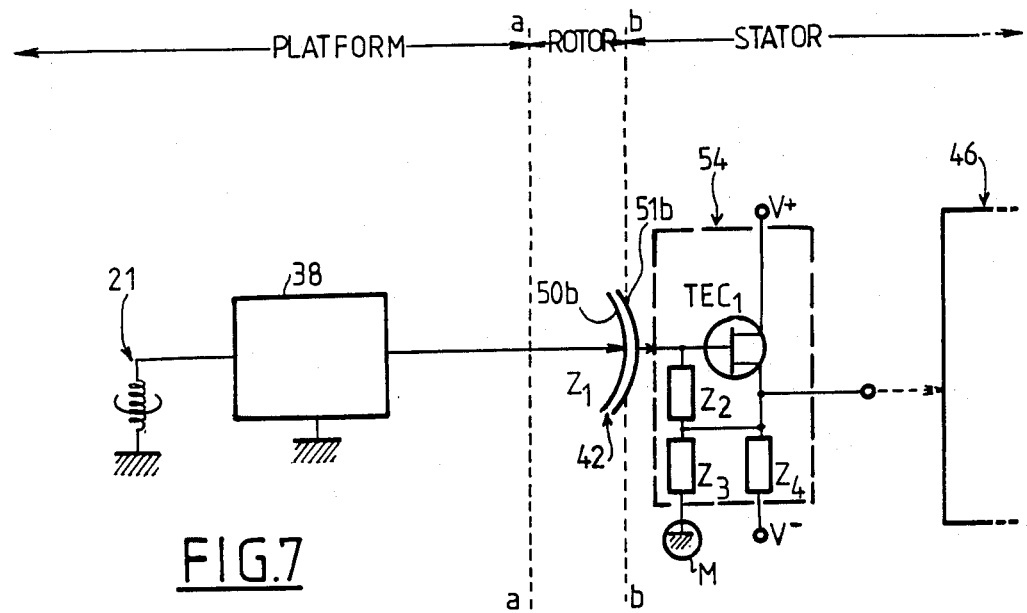
FIGS. 7 and 8 are electronic circuit diagrams showing the circuits connecting the stator and a head, respectively for reading and for writing.
Figure 8:
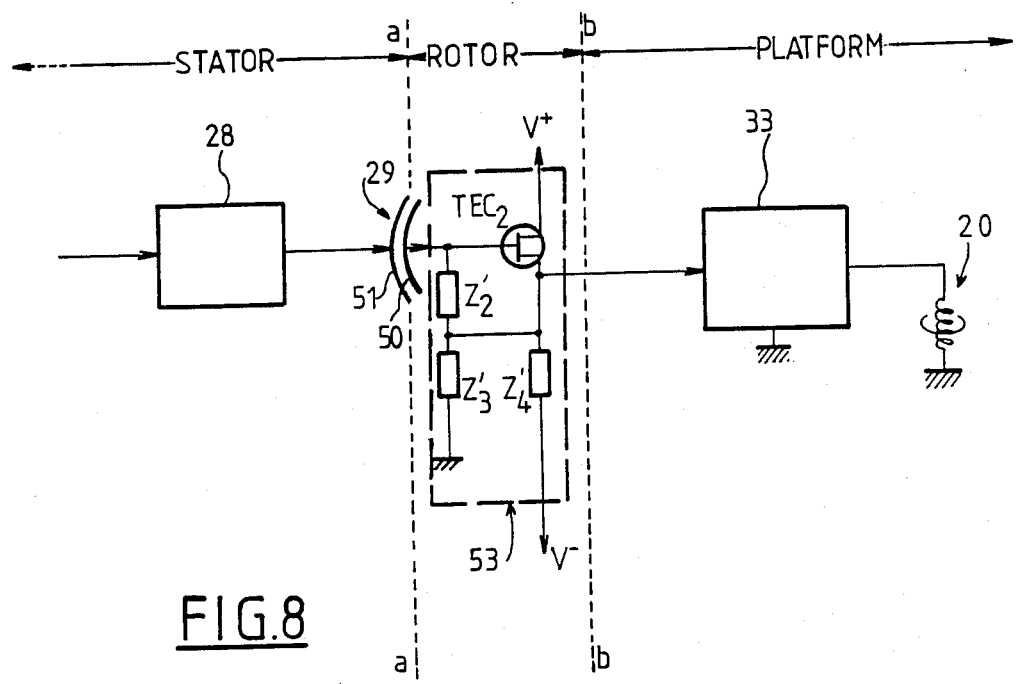
Figure 9:
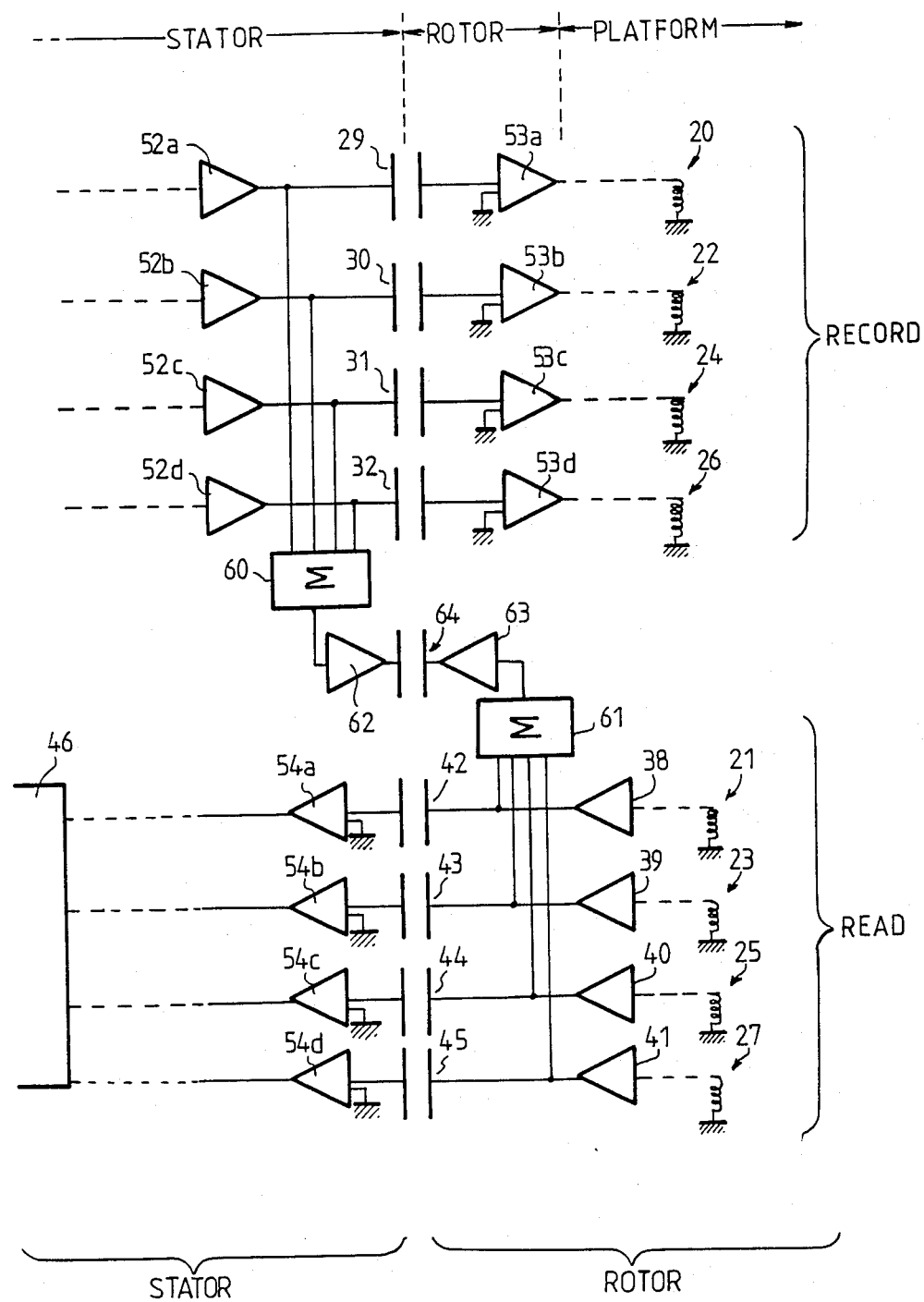
FIG. 9 is a diagram showing one embodiment of ground return means in accordance with the invention.

The following description given with reference to FIGS. 7 to 9 describes a device in accordance with the invention from the electronic point of view, i.e. it describes the connections between the various circuits and components, together with the functions of said circuits.

FIG. 7 is a detailed view based on the diagram of FIG. 4 showing the electronic circuitry associated with one of the magnetic read heads. In this case, read head 21 is connected to its associated amplifier circuit 38, both of which are disposed on the rotating plate 5.

The output from conventional amplifier circuit 38 is connected to the coupling capacitor 42 via the hub 14 of the rotor, and more particularly it is connected to the rotating plate 50b which in this case constitutes the receive plate. The stationary plate 51b, which in this case constitutes the emit plate, is connected to the read means 46 (see FIG. 4).

The respective dotted separation lines a-a and b-b indicate the respective locations of the above-mentioned platform, rotor, and stator.

After being picked up by the head 21, information is amplified by the circuit 38 and then transmitted from the rotor to the stator via the coupling capacitor 42 and then to the read means 46 for further processing via the high impedance receive circuit 54.

The amplifier circuit 38 has low output impedance, for example 10 ohms.

The receive circuit 54 includes a component having high input impedance, namely a field effect transistor TEC1 whose grid receives the signal from plate 51b and is also connected to ground return means M via series-connected impedances Z2 and Z3. The drain of TEC1 is connected to a source of positive voltage V+ and the source of TEC1 is connected firstly to a source of negative voltage V− via an impedance Z4, and secondly to the ground return means M via the impedance Z3.

The term "ground return means" M designates means for providing an electrical ground return path for the rotating circuits back to the stator.

The impedances Z2 and Z3 are preferably 0.5 Mohm resistances while the impedance Z4 is preferably a capacitor having a capacitance of a few nF.

The above-described and shown circuit including the impedances Z2, Z3, and Z4 is advantageous for the following reason.

Given the small capacitances of the coupling capacitors, namely less than 20 pF, it is necessary to provide a high input impedance (of several megohms) in parallel with ground between the coupling capacitor and the transistor TEC1 in order to obtain as low a bottom cut-off frequency as possible (i.e. in order to move the bottom limit of the passband down as far as possible). Unfortunately, such an impedance (e.g. 10 megohms) would give rise to difficulties given its sensitivity to severe environmental stresses (condensation, radiation, etc.) in which the magnetic recording/reading devices in accordance with the invention are required to operate.

A single 10 megohm impedance is replaced by an equivalent circuit Z2, Z3, and Z4 which is referred to as a "boot-strap" circuit and which is constituted by components each of which is of relatively low impedance.

FIG. 8 shows the details of the electronic circuitry for one of the record heads, and in particular for record head 20.

The emit means 28 (see FIG. 4) have low output impedance and are connected to coupling capacitor 49, and more precisely to the stationary plate 51.

The rotating plate 50 is connected to receive circuit 53 (see FIGS. 4 and 5) mounted on the rotor. The output from the circuit 53 is connected to the amplifier circuit 33 which is associated with the record head 20, both of which are mounted on the platform.

The receive circuit 53 is similar in design and operation to the receive circuit 54 of FIG. 7; and similarly the amplifier circuit 33 is similar to the amplifier circuit 38 of FIG. 7.

Likewise, in FIG. 8, vertical dashed lines a—a and b—b respectively associated with the words STATOR, ROTOR, and PLATFORM, delimit the locations in which the respective circuits are mounted.

Thus, each read head is associated with a set of circuits as shown in FIG. 7 and each recording head is provided with a set of circuits as shown in FIG. 8.

The receive circuits regardless of whether they are in a recording circuit chain or a read circuit chain are always placed as close as possible to the corresponding receive plate of the associated coupling capacitor. Too long a line for transmitting the signal from the capacitor to the receive circuit would be subjected firstly to stray capacitance (giving rise to a high degree of attenuation), and secondly to interference on the line given the high value of the input impedance to the receive circuit compared to the impedance of the line.

Advantageously, the receive circuits 53a, 53b, 53c, and 53d associated with the recording capacitors, and thus disposed on the rotating equipment, are disposed on the bodies supporting the capacitor plates, and more particularly on the top faces of the base webs of the U-shapes (when seen in section, see FIG. 6).

The rotating receive circuits 53a, 53b, 53c, and 53d, and the amplifier circuits disposed on the plate are embodied using surface mounting technology.

The information emit circuits 52a, 52b, 52c and 52d transmit information via respective coupling capacitors 29, 30, 31, and 32, and respective receive circuits 53a, 53b, 53c, and 53d, to the recording heads 20, 22, 24, and 26.

Conversely, when reading, the read heads 21, 23, 25, and 27 pick up information from the tape. The information is transmitted via respective amplifier circuits 38 to 41, and respective coupling capacitors 42 to 45 to the receive circuits 54a, 54b, 54c, and 54d, and then to the read means 46.

In accordance with the invention, the device also includes ground return means which are described below with reference to FIG. 9 and in which items which are similar to those described with reference to FIG. 4 have the same reference numerals.

The circuits described above include ground connections, and it is therefore necessary to provide a ground return which is common to the circuits disposed on the rotating members (platform and rotor).

The ground return means in accordance with the invention operate in differential mode and comprise:

a first summing and inverting circuit 60 having four inputs branching respectively from the connections between the emitter circuits 52i (i =a, b, c, d) and the corresponding recording coupling capacitors 29 to 32;

a second summing and inverter circuit 61 having four inputs branching respectively from the connections between the read coupling capacitors 42 to 45 and the amplifier circuits 38 to 41;

a first amplifier 62 receiving the output from the first summing circuit 60, and a second amplifier circuit 63 receiving the output from the second summing circuit 61; and an additional rotating coupling capacitor 64 (of the same type as those described above), whose stationary plate is connected to the output from the first amplifier 62 and whose rotating plate is connected to the output from the second amplifier 63.

The summing circuits 60 and 61 deliver the sums of the corresponding inputs with a change of sign; for example the summing and inverting circuit 60 may receive four current values $i_1$, $i_2$, $i_3$, and $i_4$, in which case it delivers a current output signal of value $-(i_1+i_2+i_3+i_4)$.

Thus, the additional coupling capacitor 64, referred to as the ground return capacitor, receives the inverted sum of the recording currents coming from the emit circuits on its stationary plate, and the inverted sum of the read currents coming from amplifiers 38 to 41 (on the plate) on its rotating plate.

As a result, the sum of the currents passing "through" the coupling capacitors is zero.

The additional coupling capacitor operates in what could be called "pseudo-differential" mode.

Further, and optionally, a conventionally mechanical type rotating ground contact may be provided which receives all of the grounds represented in the circuit diagrams. The purpose of such a mechanical rotating contact is to avoid accumulation of high potential static electric charge on the rotating portions of the recorder (rotor, platform).

In a variant embodiment (not shown) of the ground return means, the ground return means comprise the following circuits (given that these variant means may likewise be associated with a conventional rotating ground contact as described above):

a first summing and inverting circuit whose four inputs branch from respective ones of the connections between the emit circuits 52i (i=a, b, c, d) and each of the record coupling capacitors 29 to 32;

a second summing and inverting circuit whose four inputs are connected to the outputs from the receive circuits 54i associated with the read capacitors;

a differential amplifier whose neegative input is connected to the output from the first summing circuit and whose positive input is connected to the output from the second summing circuit; and an additional rotating coupling capacitor (of the same type as described above) whose stationary plate is connected to the output from the differential amplifier and whose rotating plate is connected to a common ground contact.

Like the embodiment shown in above-described FIG. 9, this second variant makes it possible to ensure that the sum of the currents passing "through" the coupling capacitors is zero.

The above description refers to coupling capacitors in which the plates are plane, concentric, and cylindrical. Without going beyond the scope of the invention, these plates may be:

either concentric and annular, with the two facing surfaces being parallel to the plane of head rotation; or concentric and generally cylindrical in shape but having a curved surface whose concave side facing the axis of the drum.

The plates may also be constitued by sectors of a cylinder (having a plane or a curved surface).

Finally, the plates are not necessarily concentric. If they are not concentric, the device is provided with electronic means for automatically compensating the cyclic variation in the distance between facing plates as the rotor rotates.

I claim:

1. A rotary electric coupling device in a recorder/-reader of magnetic tape including at least one magnetic head rotated at the periphery of an equatorial slot through a cylindrical drum over which a helically wound tape is caused to run, said device operating to transmit electrical signals representative of recorded information and/or information read from the tape between a rotor-forming rotating portion connected to the head and a stator-forming stationary portion connected to electronic means respectively for emitting and/or receiving said informtion, wherein the device comprises, for each head, a capacitor comprising two conducting plates disposed facing each other and fixed respectively to the rotor and to the stator.

2. A device according to claim 1, wherein the capacitor plates are cylindrical and concentric.

3. A device according to claim 1, wherein each capacitor plate is fixed to a support-forming body which is generally annular in shape and made of insulating material.

4. A device according to claim 3, wherein the capacitor plates are disposed on the support bodies by metallization.

5. A device according to claim 3, wherein the bodies are generally U-shaped in section, with coplanar webs extending transversely to the rotor, and with the conducting capacitor plates being applied to the respective outside faces of the facing flanges of said bodies.

6. A device according to claim 3, wherein the height of each capacitor plate is less than the height of the corresponding body.

7. A device according to claim 1, wherein one of the plates of each capacitor is connected to a receive circuit comprising a high input impedance component such as a field effect transistor.

8. A device according to claim 7, wherein the receive circuit also has an impedance value which is high in comparison with the equivalent input capacitance of the field effect transistor at low frequency.

9. device according to claim 8, wherein the high value impedance is constituted by a plurality of impedances (resistor and capacitor components) disposed in an equivalent circuit of the so-called "boot-strap" type.

10. A device according to claim 1, for use with a recorder/reader comprising a series of magnetic recording heads and a series of magnetic read heads, wherein each head corresponds to a respective record or read coupling capacitor.

11. A device according to claim 10, wherein some of the moving capacitor plates are connected to circuits mounted on the rotor, and wherein some of the moving capacitor plates are connected to circuits mounted on the rotating portion carrying the heads.

12. A device according to claim 11, wherein the circuit mounted on the rotor is constituted by a receive circuit connected to one of the plates of the corresponding capacitor and constituted by a high input impedance component such as a field effect transistor and is mounted on the top face of a generally annular support body of insulating material for supporting the rotating portion of the capacitor.

13. A device according to clam 10, wherein each coupling capacitor is provided with two metal screening rings which are generally L-shaped in section and each having a base web extending transversely to the rotor and respectively fixed to the rotating and the stationary base web portions of the capacitors.

14. A device according to claim 13, wherein each capacitor plate is fixed to a generally annular support-constituting body made of insulating material, and each of the screening rings is provided with a lip pressed against the face of each body carrying the corresponding capacitor plate.

15. A device according to claim 1, wherein one of the plates is connected to an emit circuit including a low output impedance component such as a transistor.

16. A device according to claim 11, wherein one of the plates of each capacitor is connected to a receive circuit comprising a high input impedance component such as a field effect transistor and wherein the receive circuits connected to the respective moving plates and the amplifier circuits disposed on the rotating portion carrying the heads, are constituted by surface mounting technology.

17. A device according to claim 1, including electrical ground return means for the rotating portion, said means including additional rotating coupling means and means suitable for delivering a current to the terminals of said additional coupling means which is opposite in sign to the current passing through each of the coupling capacitors transmitting information signals.

18. A device according to claim 17, wherein each head corresponds to a respective record or read copling capacitor and wherein the ground return means comprise an additional rotating capacitor having one plate connected to the output of a first amplifier whose input is connected to the output of a first summing and inverting circuit receiving currents relating to each of the signals from respective ones of the emitter circuits (belonging to the record capacitors), and with the other plate of said additional capacitor being connected to the output of a second amplifier whose input is connected to the output of a second summing and inverting circuit receiving currents relative to each of the signals from respective ones of the receive circuits (belonging to the read capacitors).

* * * * *